(12) United States Patent
Le (10) Patent No.: US 6,549,006 B2
(45) Date of Patent: *Apr. 15, 2003

(54) EDDY CURRENT MEASUREMENTS OF THIN-FILM METAL COATINGS USING A SELECTABLE CALIBRATION STANDARD

(76) Inventor: Cuong Duy Le, 1816 Club Dr., Gilroy, CA (US) 95020

( * ) Notice: Subject to any disclaimer, the term of this patent is extended or adjusted under 35 U.S.C. 154(b) by 0 days.

This patent is subject to a terminal disclaimer.

(21) Appl. No.: 09/835,975

(22) Filed: Apr. 17, 2001

(65) Prior Publication Data

US 2002/0149360 A1 Oct. 17, 2002

Related U.S. Application Data (63) Continuation-in-part of application No. 09/545,119, filed on Apr. 7, 2000, now Pat. No. 6,407,546.

(51) Int. Cl.$^7$ .............................. G01B 7/06; G01R 33/12
(52) U.S. Cl. ....................... 324/230; 324/229; 324/225; 702/104
(58) Field of Search ................................. 324/229, 230, 324/240, 225; 702/104; 364/571.07

(56) References Cited

U.S. PATENT DOCUMENTS

| | | | |
|---|---|---|---|
| 2,916,694 A | * 12/1959 | Hanysz et al. | 324/230 |
| 4,727,322 A | 2/1988 | Lonchampt et al. | 324/229 |
| 4,849,693 A | * 7/1989 | Prince et al. | 324/225 |
| 4,849,694 A | * 7/1989 | Coates | 324/230 |
| 4,893,079 A | * 1/1990 | Kustra et al. | 324/225 |
| 5,341,678 A | * 8/1994 | Kervinen | 73/150 R |
| 5,485,082 A | * 1/1996 | Wisspeintner et al. | 324/202 |
| 5,525,903 A | * 6/1996 | Mandl et al. | 324/230 |
| 5,552,704 A | 9/1996 | Mallory et al. | 324/233 |
| 5,559,431 A | * 9/1996 | Sellen | 324/202 |
| 5,781,008 A | * 7/1998 | Muller et al. | 324/230 |
| 5,963,031 A | * 10/1999 | de Halleux et al. | 324/230 |
| 6,291,992 B1 | * 9/2001 | van Andel et al. | 324/240 |
| 6,369,565 B1 | * 4/2002 | Dobler et al. | 324/225 |
| 6,407,546 B1 | * 6/2002 | Le et al. | 324/230 |

FOREIGN PATENT DOCUMENTS

GB    2112944 A  *  7/1983   ............ G01B/7/10

* cited by examiner

Primary Examiner—Edward Lefkowitz
Assistant Examiner—Darrell Kinder
(74) Attorney, Agent, or Firm—Jeffrey J. Lotspeich; Gary L. Eastman (57) ABSTRACT

A method for identifying metal layer thickness of an inspection sample according to one embodiment utilizes an eddy current probe to obtain initial resistance and reactance measurements from the inspection sample. Once these measurements have been obtained, the relative distance between the eddy current probe and inspection sample is increased and terminating resistance and reactance measurements are obtained. An inspection sample intersecting line may then be calculated using the initial and terminating resistance and reactance measurements. An intersecting point between a natural intercepting curve and the inspection sample intersecting line may also be determined. A reactance voltage of the intersecting point along a digital calibration curve is calculated to identify a closest two of a plurality of calibration samples. The metal layer thickness of the inspection sample may then be calculated by performing an interpolation between the identified closest two calibration samples.

15 Claims, 6 Drawing Sheets

EDDY CURRENT MEASUREMENTS OF THIN-FILM METAL COATINGS USING A SELECTABLE CALIBRATION STANDARD

RELATED APPLICATIONS

This application is a continuation-in-part of U.S. application Ser. No. 09/545,119 filed Apr. 7, 2000 now U.S. Pat. No. 6,407,546.

FIELD OF THE INVENTION

The present invention is directed to measuring metal coatings on semiconductor wafer products, and more particularly, to measuring the thickness and sheet resistance of thin-film metal coatings on semiconductor wafer products using selectable calibration materials.

BACKGROUND OF THE INVENTION

As semiconductor wafers increase in size, the costs involved in the production of these wafers also increase. The semiconductor fabrication industry continues to demand higher yields and shorter fabrication times, while insisting upon ever-increasing quality standards. A variety of inspection procedures have been employed during various stages of the semiconductor wafer fabrication process in an attempt to meet these demands. These inspection procedures include destructive, as well as nondestructive testing methods.

During a chemical mechanical polishing (CMP) process, for example, measurement of the thickness of a deposited metal layer on a semiconductor substrate is often required. Metal layer measurements may be performed off-line during a standalone process, or as part of the fabrication process.

In a destructive measuring process, a standard or electron microscope may be used to measure the thickness of a wafer's coating after a cross-section has been obtained. When the thickness of a thin-film coating is greater than 10,000 Å, this type of destructive measuring method often provides accurate measurements. However, measuring accuracy usually begins to degrade as the coating thickness falls below the 10,000 Å threshold.

Other types of measuring processes utilize sensitive eddy current sensors which do not destroy or significantly alter the article measured. Although eddy current sensors provide highly accurate readings, these sensors are susceptible to error. For example, the shifting of an electronic reference point due to thermal drifting often occurs at some point during the data collection and inspection process. To compensate for thermal drifting and to ensure accurate readings, the eddy current sensor must be constantly recalibrated.

While there have been attempts to employ highly accurate, nondestructive measuring devices to accurately determine the thickness of thin-film metal layers disposed on semiconductor substrates, improvement is still needed.

SUMMARY OF THE INVENTION

A method for identifying metal layer thickness of an inspection sample according to one embodiment utilizes an eddy current probe to obtain initial resistance and reactance measurements from the inspection sample. Once these measurements have been obtained, the relative distance between the eddy current probe and inspection sample is increased and terminating resistance and reactance measurements are obtained. An inspection sample intersecting line may then be calculated using the initial and terminating resistance and reactance measurements. An intersecting point between a natural intercepting curve and the inspection sample intersecting line may also be determined. A reactance voltage of the intersecting point along a digital calibration curve is calculated to identify a closest two of a plurality of calibration samples. The metal layer thickness of the inspection sample may then be calculated by performing an interpolation between the identified closest two calibration samples.

In accordance with one aspect of the present invention, each of the plurality of calibration samples have metal layers of a type of material that is different than the inspection sample.

In accordance with another aspect of the present invention, each of the plurality of calibration samples include a metal layer comprising annealed Ti 6-4, while the metal layer of the inspection sample comprises annealed copper.

In another aspect of the present invention, the inspection sample comprises a semiconductor wafer having a metal top-layer. In this aspect, each of the plurality of calibration samples includes a metal layer comprising annealed Ti 6-4, while the metal top-layer of the semiconductor wafer comprises annealed copper.

In still yet another aspect of the present invention, the inspection sample intersecting line eliminates offsetting error to compensate for thermal drift present in the eddy current probe.

DETAILED DESCRIPTION OF A PREFERRED EMBODIMENT

Figure 1:
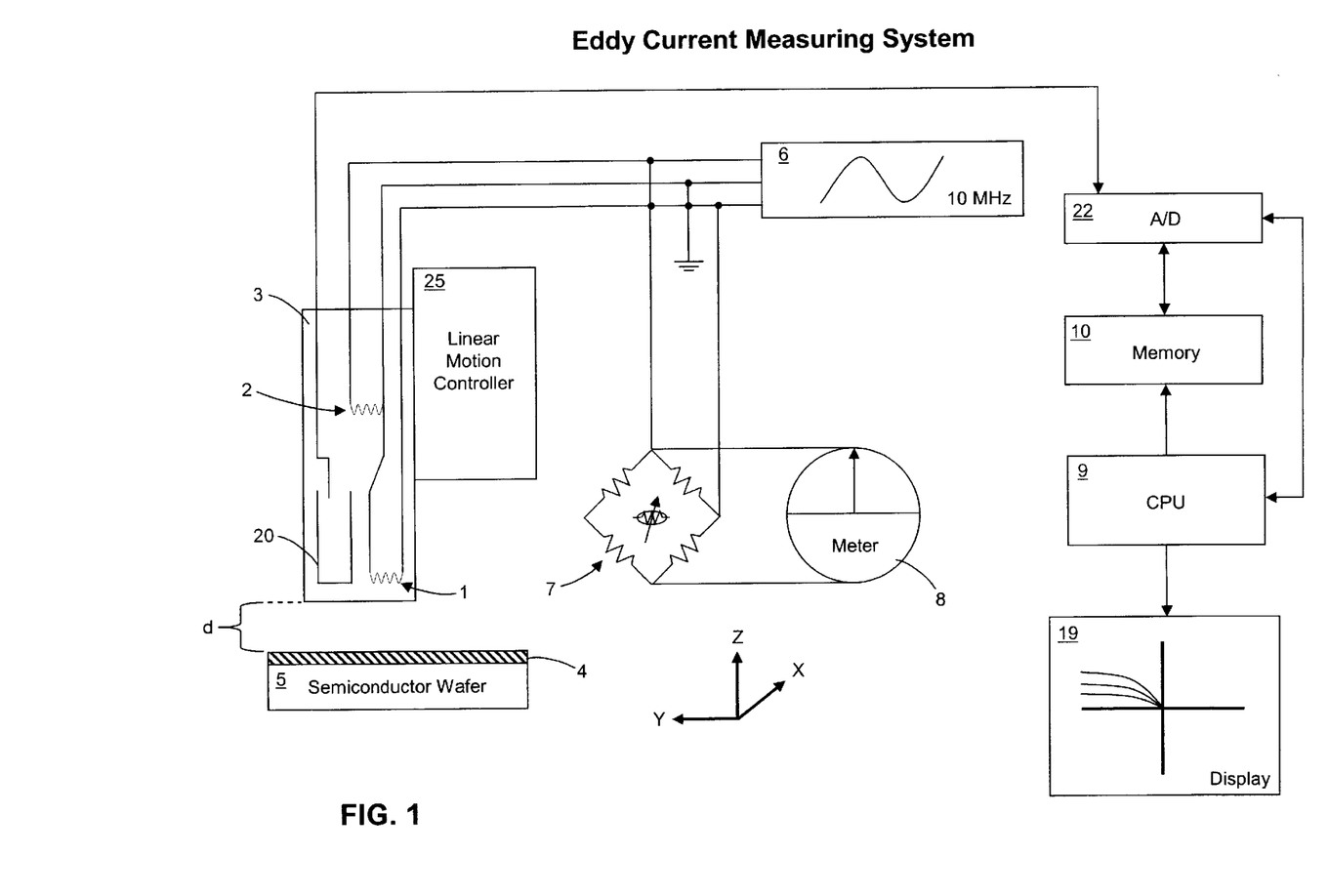
FIG. 1 is a diagram showing an eddy current measuring system according to one embodiment of the present invention.

FIG. 1 is a diagram showing an eddy current measuring system according to one embodiment of the present invention. As shown, the system includes a probe housing 3 having a sense coil 1, reference coil 2, and a capacitance sensor 20. The probe housing 3 is shown in communication with a linear motion controller 25 which, during operation, translates the probe housing 3 relative to a measuring sample 5. Specifically, the linear motion controller 25 translates the probe along a vertical axis Z that is normal to a top layer 4 of the measuring sample 5. A measuring sample 5 may include an inspection sample or a calibration sample; an "inspection sample" referring to a substrate having a top metal layer of unknown thickness, and a "calibration sample" denoting a substrate having a top metal layer of a known thickness.

The sense and reference coils 1, 2 are similarly configured such that both coils are constructed of ferrite cores of the same size, have the same number of coil turns, and are both constructed of similarly sized magnetic cable (40 gauge). The sense and reference coils 1, 2 should be fabricated so that their respective inductance values are equal at 10 MHz, while the resistance of each coil 1, 2 must be less than 20 Ohms.

An AC voltage source 6 is electrically connected to a Wheatstone Bridge 7, which in turn contains sense and reference coils 1, 2. The AC voltage source 6 acts as a voltage driver providing pre-selected sinusoidal waves at 10 MHz or higher to the Wheatstone Bridge 7. Preferably, a sinusoidal wave is utilized so that the maximum phase separation between samples of differing thicknesses can be realized. FIG. 1 further shows the system having an adjustable electronic bridge circuit 8 applied to the Wheatstone Bridge 7.

During operation, analog signals generated by components within the probe housing 3 are converted by an analog to digital (A/D) board 22 into digital signals which are stored as data on a computer hard-drive and in memory 10 (e.g., Static Random Access Memory (SRAM)). The stored data may be used for further processing or calculations by the CPU 9. If necessary, the stored data may be represented on display 19.

The capacitance sensor 20 serves as a proximity sensor for maintaining the sense coil 1 at a constant distance relative to the surface of metal layer 4. For example, it is known that capacitance sensors produce maximum voltage in air when there is no interference or interruption in charge path from negative to positive poles. Accordingly, as the capacitance sensor 20 approaches contact with the surface of metal layer 4, the charge experiences interference, thereby producing a voltage drop. By selecting a specific voltage output from the capacitance sensor 20, a specific distance (distance 'd') can be maintained.

Distance 'd' defines a distance between the sense coil 1 and the surface of metal layer 4 where a maximum magnitude of eddy current signals can be obtained. According to one embodiment, distance 'd' is about 75 microns, which may be indicated by an output of 5 Volts from the capacitance sensor 20. Notably, the invention generates these eddy current signals while the sense coil 1 avoids contact with the surface of the metal layer 4. Use of the capacitance sensor 20 eliminates the need for any additional proximity devices, such as an optical microscope, for maintaining the relative spatial relationship between the sense coil 1 and the metal layer 4.

In accordance with the present invention, the eddy current system shown in FIG. 1 may be used to measure the thickness and sheet resistance of metal coatings disposed on semiconductor wafer products. To accomplish such measurements, calibration samples having a top metal layer of known thicknesses are measured during a calibration session. Calibration samples A, B, C, D, and E will be used herein to define five such calibration samples having a top metal layer fabricated with Ti 6-4 and measuring 50,000, 100,000, 150,000, 170,000, and 200,000 Å, respectively.

Because of the aforementioned difficulty in measuring metal layers less than 10,000 Å, for example, the present invention utilizes calibration samples having metal layers of a lower conductivity than that present in an inspection sample.

For example, reference will be made to calibration samples comprising a relatively lower conductive material of annealed Ti 6-4, and inspection samples comprising the relatively higher conductive material of annealed copper. Based upon the well established International Annealed Copper Standard (IACS), the conductivity of annealed copper is the standard by which all other electrical conductors are compared. According to this standard, the conductivity of annealed copper is measured as 100 LACS, while the lower conductive material of annealed Ti 6-4 is measured as a fractional percentage (1/100) of that of annealed copper.

Utilizing this known relationship, the conductivity of a particular thickness of annealed copper is equal to a layer of Ti6-4 that is 100 times thicker than the annealed copper. One example of this principal is illustrated by noting that the conductivity of a 1,000 Å layer of annealed copper is equal to the conductivity of a 100,000 Å layer of Ti 6-4 (100×1,000 Å=100,000 Å).

In accordance with the invention, measurement of calibration samples having known thicknesses of Ti 6-4 may be used in determining the thickness of a copper metal layer disposed on a semiconductor wafer utilizing the above-described conductive relationship between these materials. And as will be described in detail herein, the calibration of an eddy current measuring probe for measuring micro-thin copper layers, for example, can be accomplished using a relatively thick layer of material such as Ti 6-4.

To illustrate the conductive relationship between metal layers of inspection and calibration samples of the invention, the following is presented.

$$\rho = 172.41/\sigma$$

Where $\rho$ denotes resistivity and $\sigma$ defines conductivity in IACS units.

$$\rho = \text{Thickness} \times \text{Sheet resistance} = t \times R(s)$$

Where t denotes thickness and R(s) defines sheet resistance, thus providing the following equation:

$$R(s) = \rho/t$$

From this relationship, the following equations may be provided:

$$R(s)\text{copper} = \rho \text{ copper}/t \text{ copper}$$

$$R(s)\text{Ti-6-4} = \rho \text{ Ti 6-4}/t \text{ Ti 6-4}$$

Assume now a calibration sample having a Ti 6-4 layer that measures 100,000 Å, and an inspection sample having a copper layer that is 1,000 Å. Substituting these values into the appropriate above-two equations provides the following. With regard to the copper inspection sample:

$$R(s)copper = (171.41/\sigma)/1{,}000 \text{ Å}$$
$$(171.41/100 \text{ } IACS)/1{,}000 \text{ Å}$$
$$171.41/100{,}000 \text{ Å } (IACS).$$

With regard to the Ti 6-4 calibration sample:

$$R(s)Ti\ 6\text{-}4 = (171.41/1 \text{ } IACS)/100{,}000 \text{ Å}$$
$$= 171.41/100{,}000 \text{ Å } (IACS).$$

Accordingly, it is demonstrated that:

$$R(s)\text{copper} = R(s)\text{Ti 6-4}$$

when the Ti 6-4 layer measures 100,000 Å, and the copper layer measures 1,000 Å.

Knowledge of equivalent electrical behavior, in terms of equivalent sheet resistance, of materials comprising the inspection and calibration samples permit the use of calibration samples having metal layers (Ti 6-4) that are 100 times thicker than copper layers disposed on an inspection sample (semiconductor wafer).

By way of specific example, calibration samples may include metal layers of annealed Ti 6-4 having a range of thicknesses such as 10,000, 20,000, 30,000, 40,000, 50,000, 60,000, 70,000, 80,000, 90,000, or 100,000 Å. Using the previously described conductivity relationship between annealed Ti 6-4 and annealed copper, each of the just-described Ti 6-4 layer thicknesses may be used to represent a specific eddy current response of an inspection sample comprising a layer of annealed copper having a thickness of, respectively, 100, 200, 300, 400, 500, 600, 700, 800, 900, and 1,000 Å. Accordingly, the measurement of an inspection sample having a micro-thin copper layer of unknown thickness disposed upon its surface can be accomplished using calibration samples having a correspondingly thicker layer of Ti 6-4 (100 times thicker).

Those of ordinary skill will understand that metal thickness increases as sheet resistance decreases. This relationship is illustrated by the equation:

$$\rho = (\text{Thickness} \times \text{Sheet resistance})$$

where $\rho$ denotes resistivity.

The present invention preferably utilizes a thickness value for calibration rather than utilizing sheet resistance. This is because the present invention utilizes different measurement methods to obtain data from the inspection sample and the calibration sample. If sheet resistance were used for calibration, the sheet resistance would be measured by another, alternative, direct electrical method which can contribute additional error. For instance, sheet resistance can be obtained by a four-point probe when there is a fixed distance from each point of contact. In this type of configuration, constant voltage and current are applied at the two outside pins of a four-point probe, while voltage drop is measured at the two middle pins. Once the voltage drop is measured, this value, along with the current value, are known. Sheet resistance can then be obtained by an equation such as:

$$V = (I \times R).$$

In this equation, "V" denotes voltage drop, "I" denotes the current, and "R" represents the resistance. This equation represents a simple way to obtain the value of the sheet resistance. However, sheet resistance measurements comprise many variables and are therefore inherently prone to error. Such errors include the resistance at the point of contact, the reality that voltage cannot be absolutely constant, a non-planar surface sample, etc.

The selection of specific frequency, gain, and voltage drive levels is used to obtain the maximum magnitude eddy current signal response, while retaining the ability to determine phase separation at different thicknesses. For a given inspection sample material, such as copper, a calibration sample material comprising a corresponding thicker layer of Ti 6-4 may be utilized (as described above). Proper selection of frequency, gain, and voltage drive levels enable maximum phase separation and amplitude of eddy current signals between sample thicknesses (e.g., 500 Å and 1,000 Å).

During operation, AC voltage 6 introduces pre-selected sinusoidal waves at 10 MHz or higher to a Wheatstone Bridge 7. An adjustable electronic bridge circuit 8 is applied to the Wheatstone Bridge 7 to balance the circuit and zero the reference voltage. The linear motion controller 25 translates the eddy current sense coil 1 in the direction of the metal layer 4. As the sense coil 1 approaches contact with the metal layer 4 (distance 'd'), the Wheatstone Bridge 7 unbalances its voltage between legs. This voltage is then measured, detecting the amplitude of the in-phase component (X) as well as the quadrature component (Y). As used herein, X voltage values represent resistance, while the Y voltage values represent reactance.

Figure 2:
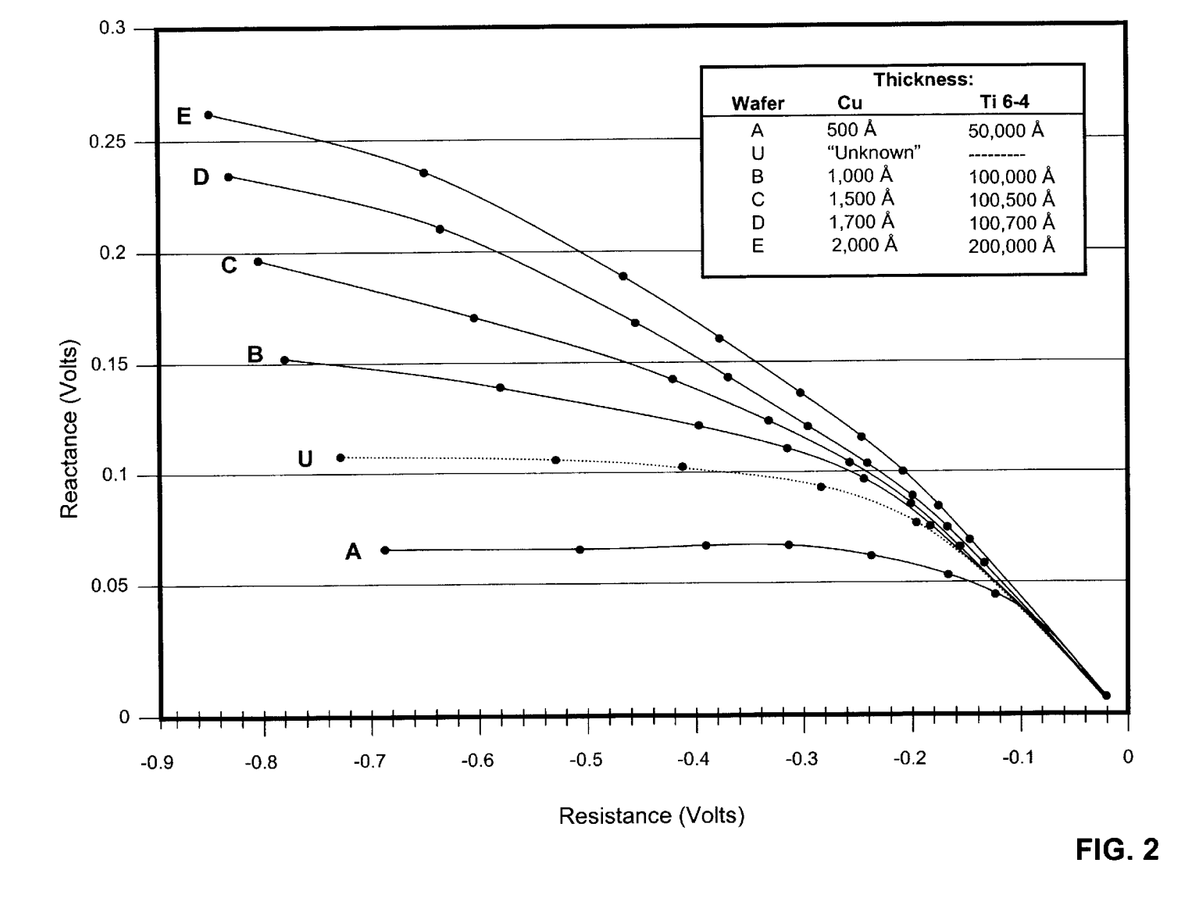
FIG. 2 is a graph showing curves relating to eddy current measurements taken from calibration and inspection samples having, respectively, known and unknown thicknesses.

FIG. 2 is a graph showing separate curves relating to eddy current measurements taken from calibration and inspection samples having, respectively, known and unknown thicknesses. This graph will be described with reference to the eddy current measuring system shown in FIG. 1.

As previously described, the present invention utilizes the known conductive relationship between materials comprising the inspection and calibration samples. Based upon this known conductive relationship, curves representing eddy current measurements obtained from calibration samples comprising variably thick layers of annealed Ti 6-4 may be correlated to inspection samples comprising relatively thinner layers of annealed copper.

For example, eddy current measurements obtained from calibration sample A (comprising a 50,000 Å layer of Ti 6-4) is identical to eddy current measurements obtained from a sample comprising a 500 Å thick layer of annealed copper. This relationship holds true for each of the remaining cures B, C, D, and E. For instance, eddy current measurements obtained from calibration samples B, C, D, and E (respectively comprising 100,000, 150,000, 170,000, and 200,000 Å layers of Ti 6-4) are respectively identical to eddy current measurements obtained from samples comprising a layer of annealed copper measuring 500, 1,000, 1,500, 1,700, and 2,000 Å.

Accordingly, curves representing eddy current measurements obtained from calibration samples comprising Ti 6-4 of variable thickness are identical to curves representing eddy current measurements obtained from samples comprising annealed copper of a thickness that is $\frac{1}{100}$ of that of the Ti 6-4 layer.

Referring still to FIG. 2, curves A through E each include initial data values (X,Y) that are illustrated on the left side of this graph, and which eventually terminate near the bottom right of this graph (0,0). For example, curve A illustrates eddy current measurements obtained from calibration sample A comprising a 50,000 Å layer of Ti 6-4. Curve A is shown having initial resistance and reactance values (X,Y) of about −0.7 Volts and 0.07 Volts, respectively. These initial resistance and reactance values are obtained while the eddy current sense coil 1 is at a non-contact position (distance 'd') relative to the surface of the calibration sample A. Again, maintaining the sense coil 1 at distance 'd' may be accomplished by monitoring or detecting a 5 volt output from the capacitance sensor 20.

Curve A further includes a series of additional eddy current measurements that ultimately terminate in resistance and reactance values (X,Y) near 0,0; thus indicating a measurement of near zero resistance and reactance voltage. These terminating resistance and reactance voltage values (X,Y) define eddy current measurements obtained when the sense coil 1 and the surface of the calibration sample A are separated by such a distance that no eddy current signal is detected. These terminating values will also be referred to herein as "eddy current on air."

Eddy current on air values may be obtained by increasing the relative distance between the sense coil 1 and the surface of the calibration sample until no eddy current signal is detected. Increasing the relative distance between these elements may be accomplished by retracting the probe housing 3 and included components (sense and reference coils 1, 2; capacitance sensor 20) away from the calibration sample. Alternatively, the calibration sample can be translated away from the probe housing 3.

Curves B, C, D, and E, may be generated similarly to the methods used to generate curve A. For instance, curves B, C, D, and E illustrate eddy current measurements obtained from calibration samples comprising Ti 6-4 of variable thickness (100,000, 150,000, 170,000, and 200,00 Å), and are respectively identical to measurements that can be obtained from a sample comprising layers of annealed copper measuring 1,000, 1,500, 1,700, and 2,000 Å.

Initial resistance and reactance values (X,Y) for each curve B, C, D, and E are obtained while the eddy current sense coil 1 is at a non-contact position (distance 'd') relative to the surface of the calibration sample. Curves B, C, D, and E also include a series of additional measurements that ultimately terminate in resistance and reactance values (X,Y) near 0,0. Each of the initial resistance and reactance values (X,Y) for each of the curves A through E may be used as the basis for the generation of a natural intercepting curve, as will now be described.

NATURAL INTERCEPTING CURVE

Figure 3:
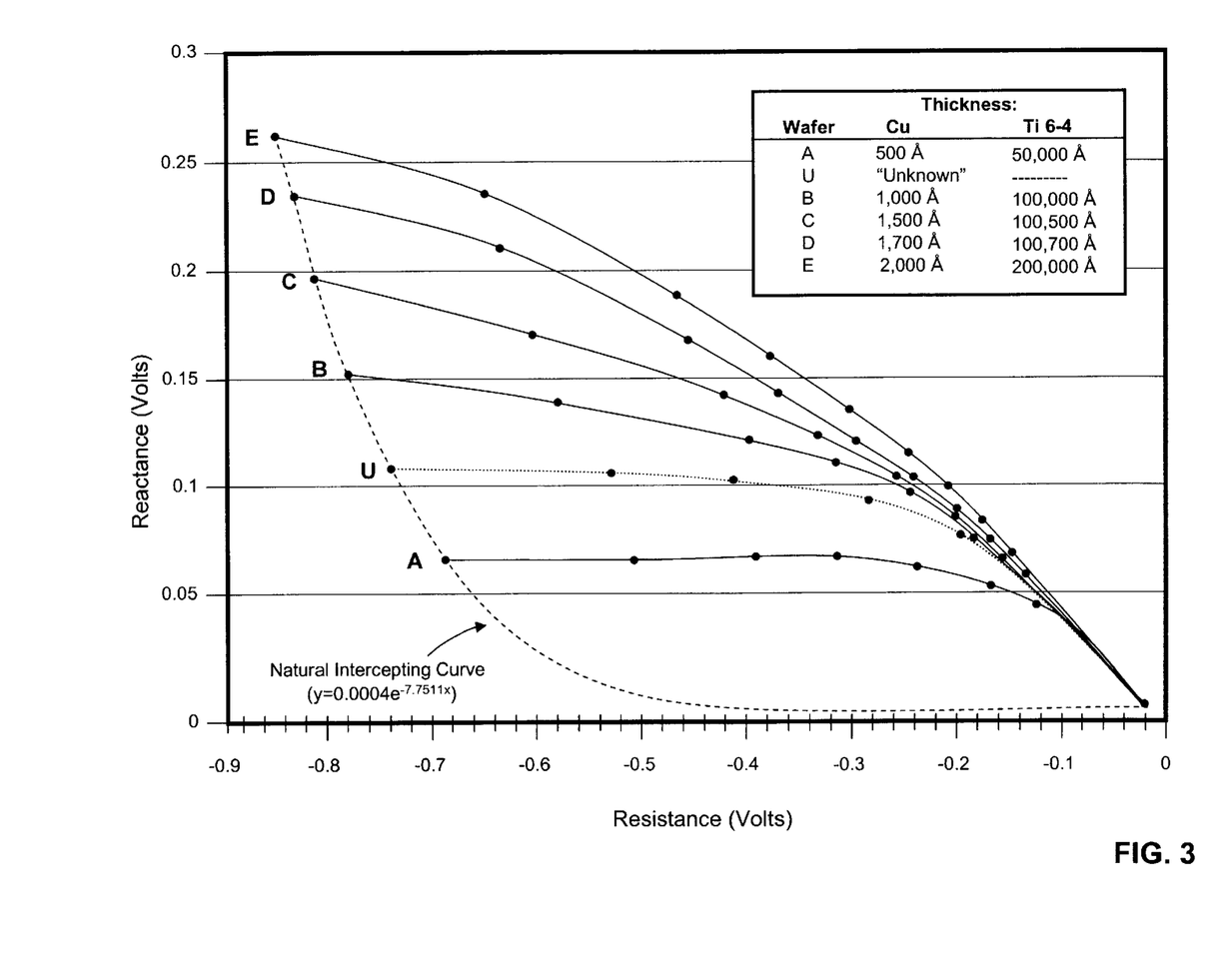
FIG. 3 is a graph showing the formation of a natural intercepting curve defined by the initial resistance and reactance values (X,Y) for each of the calibration sample curves A through E.

FIG. 3 is a graph showing the formation of a natural intercepting curve based upon initial resistance and reactance values (X,Y) of the curves A through E.

The natural intercepting curve may be generated using known curve-fitting methods, and may be represented in general form by the following equation:

$$Y = me^{-nX}.$$

The m and n coefficients can be calculated by substituting the initial resistance and reactance values (X,Y) for a particular curve into this equation.

In another calculation, a linear equation is generated for a particular curve based upon two data points; namely, the initial resistance and reactance values (X,Y) and the terminating resistance and reactance values (X,Y). For example, a first data point may be obtained while the eddy current sense coil 1 is at an initial position (distance 'd') relative to the surface of the calibration sample; and a second data point may be obtained when an eddy current on air signal is detected.

The first and second data points may then be used to generate a linear equation such as the following:

$$Y = aX + b.$$

Where 'a' defines slope and 'b' denotes the offset value present during data collection resulting from thermal drift (normally the collection of these two data points is less than 1 second), or from measuring differences that may occur when different eddy current probes are used for measuring the calibration and inspection samples. Coefficients 'a' and 'b' can be calculated by substituting the value of the (X,Y) voltage pair into the equation.

To eliminate the effects of thermal drift and eddy current probe measuring differences, the 'b' coefficient is eliminated, resulting in the following equation:

$$Y = aX$$

which will be referred to herein an "intersecting line." Eliminating the 'b' coefficient assures that the intersecting line is brought back to the original coordinates of the impedance plane (0,0). Intersecting line equations are generated for each of the calibration samples A through E; resulting in calibration sample intersecting lines A, B, C, D, and E, respectively.

INTERSECTION POINT

In another calculation, the intersection point of a calibration sample intersecting line and the natural intercepting curve is determined. This calculation is performed for each of the calibration samples A through E; resulting in calibration sample intersection points A, B, C, D, and E, respectively.

The calculation of these intersection points may be accomplished by equating the natural intercepting curve and one of the above-generated calibration sample intersecting line equations, as illustrated in the following equation:

$$me^{-nX} = aX.$$

A calculated intersection point will have coordinates (X,Y). The Y coordinate in the generated intersection point denotes reactance (Volts) and will be used as a Y coordinate in forming the digital calibration thickness curve, as will now be described.

DIGITAL CALIBRATION CURVE

Figure 4:
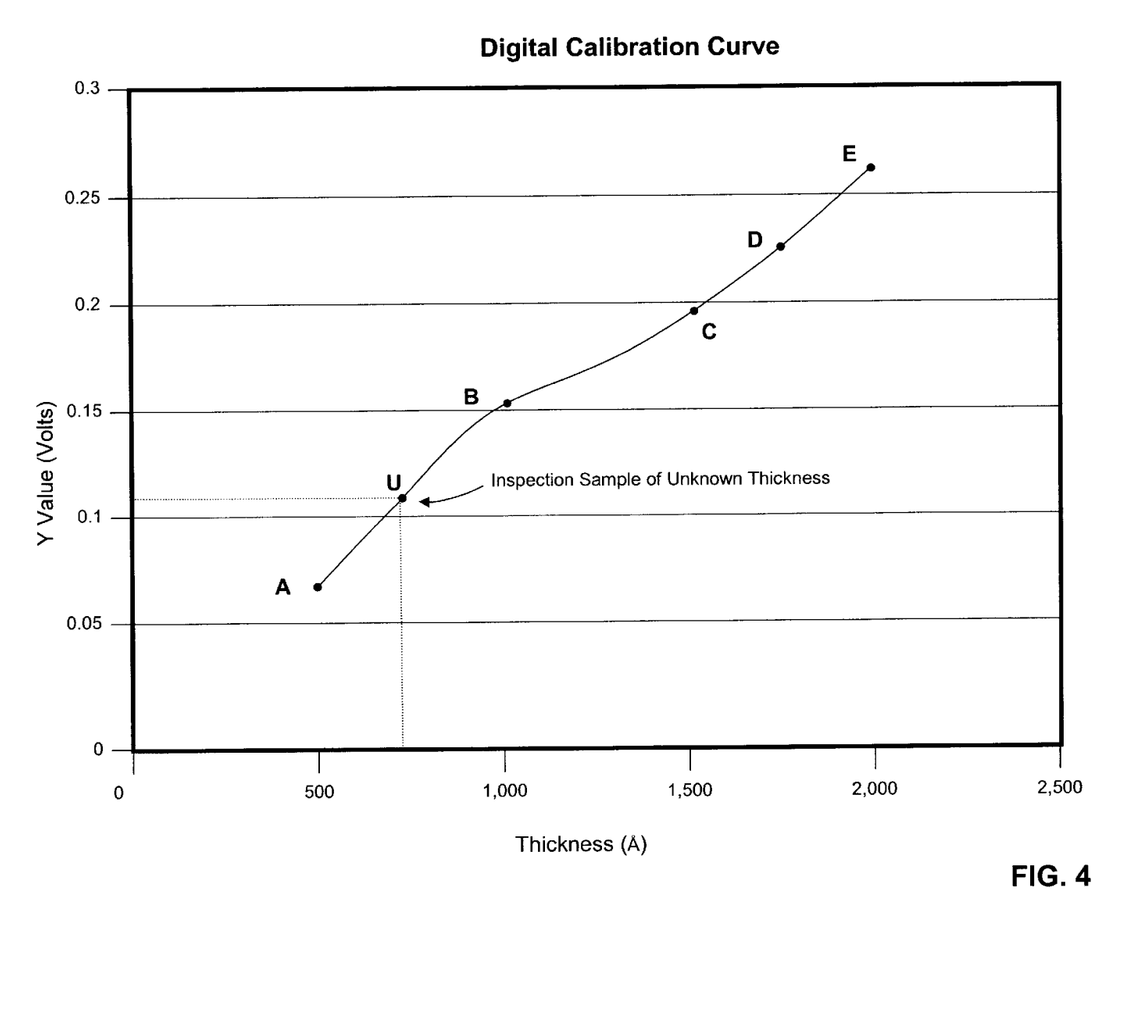
FIG. 4 is a graph showing a digital calibration curve generated by data associated with calibration samples A through E.

FIG. 4 is a graph showing a digital calibration curve generated by data associated with calibration samples A through E. The X coordinate of this graph denotes thicknesses of the various calibration samples (500 Å–2,000 Å) which again have been obtained from the correspondingly thicker layers of Ti 6-4, while the Y coordinate denotes reactance (Volts) of the previously generated calibration sample intersection point.

For example, point A defines the layer thickness and associated reactance value for calibration sample A. Specifically, point A represents a calibration sample A having copper metal layer of about 500 Å and a reactance (Volts) value of about 0.07. Similarly, calibration samples B, C, D, and E represent calibration samples having, respectively, copper metal layers measuring about 1,000, 1,500, 1,700, and 2,000 Å; and associated reactance values of about 0.152, 0.21, 0.23, and 0.27 Volts.

The digital calibration curve provides the basis for determining the thickness of metal layers disposed upon a given inspection sample. While conventional systems require constant recalibration to correct thermal drift, the present invention has no such recalibration requirements; once the digital calibration curve has been formed, no further calibration actions are necessary.

MEASURE INSPECTION SAMPLE

Figure 5:
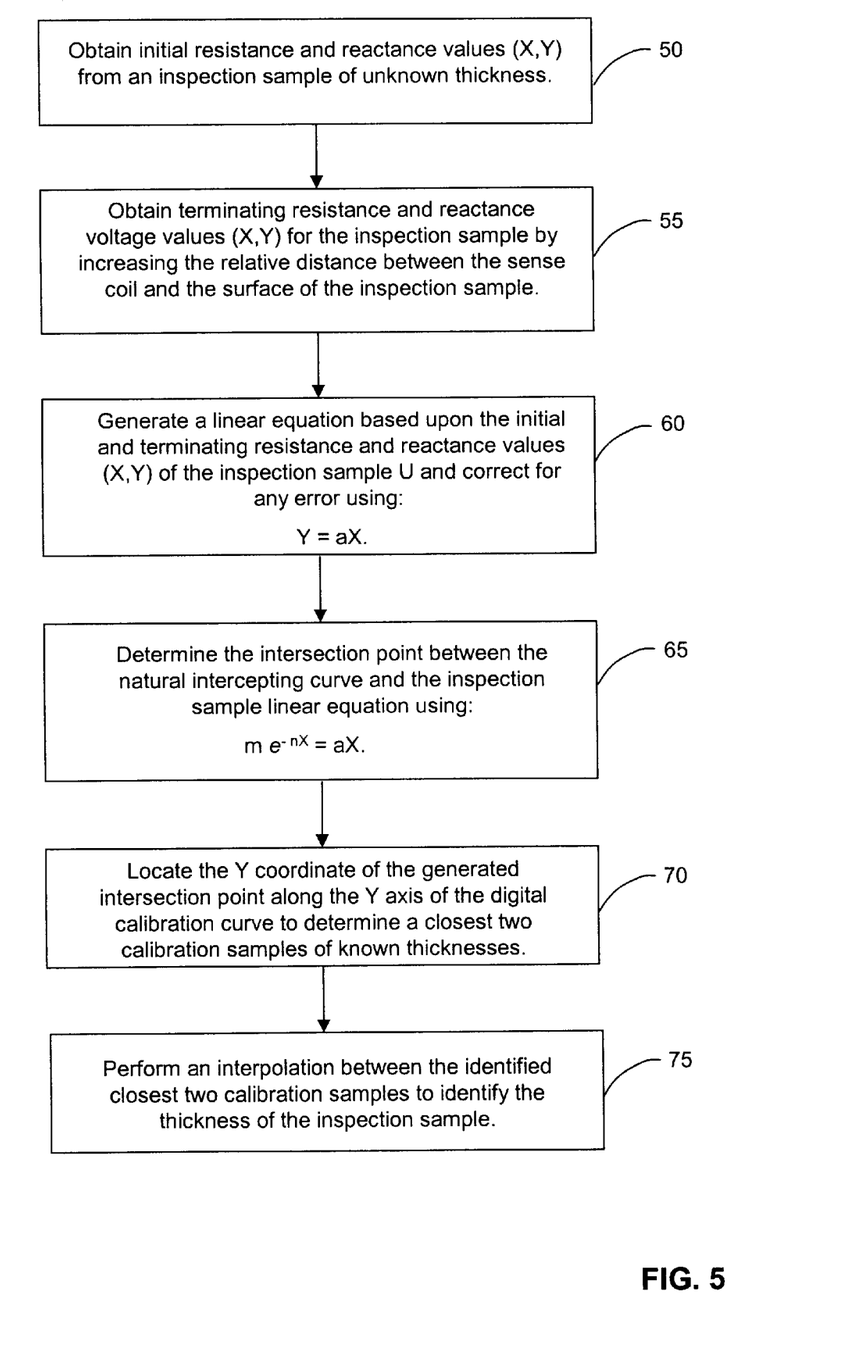
FIG. 5 is a flowchart showing exemplary operations for measuring an inspection sample of unknown thickness according to the present invention.

FIG. 5 is a flowchart showing exemplary operations for determining the thickness of a metal layer disposed upon an inspection sample according to the present invention and will be described with reference to the eddy current measuring system shown in FIG. 1, as well as the graphs shown in FIGS. 2–4. It is to be understood that at some point prior to measuring the inspection sample, a digital calibration curve (FIG. 4) has been generated by obtaining measurements from an assortment of calibration samples (described above).

As indicated in block 50, an eddy current sense coil 1 is positioned at distance 'd' relative to the surface of an inspection sample U. At this point, initial resistance and reactance values (X,Y) of the inspection sample U are obtained.

Next, the relative distance between the sense coil 1 and the surface of the inspection sample U is increased until an eddy current on air signal is detected (Block 55). The detected eddy current on air signal defines terminating resistance and reactance voltage values (X,Y) for the inspection sample U. Curve U in FIG. 2 provides an example of initial and terminating resistance and reactance values (X,Y) for the inspection sample U.

In block 60, the initial and terminating resistance and reactance values (X,Y) of the inspection sample U are used to generate the following:

i $Y=aX+b$.

The 'b' coefficient is then eliminated to correct for thermal drift and eddy current probe measuring differences, resulting in the following:

$Y=aX$.

This equation is referred to herein as intersecting line U.

As shown in block 65, the intersection point between the natural intercepting curve and the inspection sample intersecting line U may be determined by the following equation:

$me^{-nX}=aX$.

The generated intersection point will have a coordinate of (X,Y). Significantly, the Y value in the generated intersection point coordinates denotes reactance (Volts) of the intersection point. In block 70, this Y value is located along the Y axis of the previously generated digital calibration curve (FIG. 4) to determine the closest two calibration samples of known thicknesses.

For example, the Y coordinate associated with the inspection sample U will typically fall within the Y coordinates of two calibration samples. As shown in FIG. 4, the Y coordinate of the generated inspection sample intersection point falls between two calibration samples (A and B), thus indicating that the layer thickness of the inspection sample U measures between 500 Å and 1,000 Å. As indicated in block 75, the layer thickness of the inspection sample U may be more precisely determined by performing an interpolation between the appropriate two calibration samples (e.g., calibration samples A and B).

Figure 6:
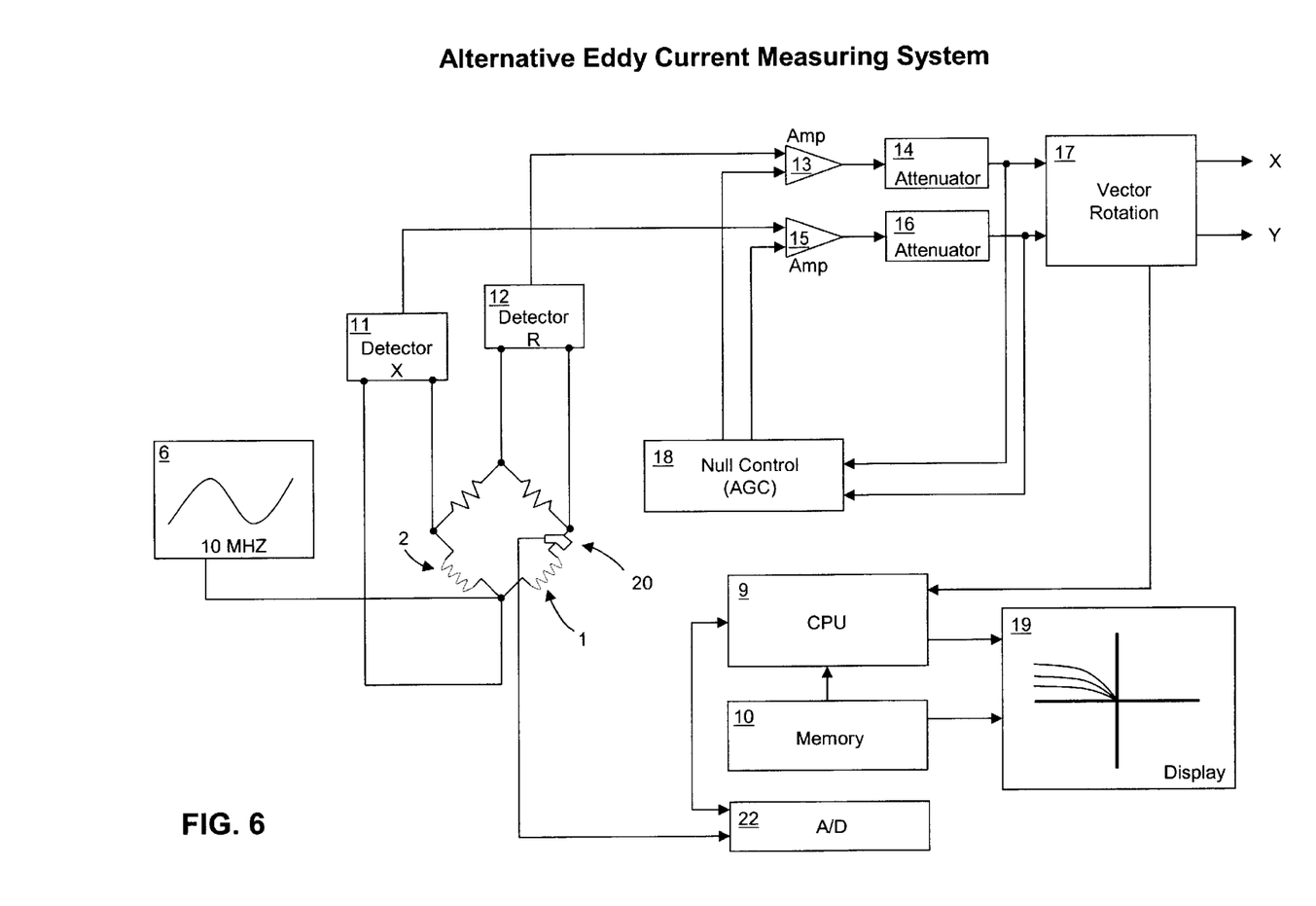
FIG. 6 is a diagram showing an eddy current measuring system according to an alternative embodiment of the present invention.

FIG. 6 is a diagram showing an eddy current measuring system according to an alternative embodiment of the present invention. In this Figure, an AC voltage source 6 is in electrical communication with sense coil 1, reference coil 2, as well as the capacitance probe 20. In this embodiment, reactance and resistance are detected by a reactance detector 11 and resistance detector 12, respectively. A detected signal is amplified utilizing an automatic gain control circuit (AGC), denoted by reference numbers 13, 14, 15, 16, and 18. Vector rotation 17 is utilized to rotate the signal so that an appropriate graphical presentation may be presented at display 19. The CPU 9 and memory 10 operate in the same manner as the eddy current measuring system shown in FIG. 1.

Various modifications and alternations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A method for identifying metal layer thickness of an inspection sample, said method comprising:

obtaining initial resistance and reactance measurements from said inspection sample using an eddy current probe positioned at a distance relative to said inspection sample;

increasing the relative distance between said eddy current probe and said inspection sample, and when an eddy current on air signal is detected, obtaining terminating resistance and reactance measurements;

calculating an inspection sample intersecting line using said initial and terminating resistance and reactance measurements;

determining an intersecting point between a previously defined natural intercepting curve and said inspection sample intersecting line, wherein said natural intercepting curve is defined by a plurality of initial resistance and reactance measurements obtained from a plurality of calibration samples having a range of known-thicknesses;

locating a reactance voltage of said intersecting point along a digital calibration curve to identify a closest two of said plurality of calibration samples, wherein said digital calibration curve is defined by a plurality of initial reactance measurements and corresponding thicknesses of said plurality of calibration samples; and identifying said metal layer thickness of said inspection sample by performing an interpolation between said closest two of said plurality of calibration samples.

2. The method according to claim 1, wherein each of said plurality of calibration samples comprise a metal layer of one type of material that is different than said metal layer of said inspection sample.

3. The method according to claim 1, wherein each of said plurality of calibration samples include a metal layer comprising annealed Ti 6-4, while said metal layer of said inspection sample comprises annealed copper.

4. The method according to claim 1, wherein said inspection sample comprises a semiconductor wafer comprising a metal top-layer; and wherein each of said plurality of calibration samples include a metal layer comprising annealed Ti 6-4, while said metal top-layer of said semiconductor wafer comprises annealed copper.

5. The method according to claim 1, wherein said inspection sample intersecting line eliminates offsetting error to compensate for thermal drift present in said eddy current probe.

6. The method according to claim 1, wherein said digital calibration curve is generated using a method comprising:

(a) obtaining initial resistance and reactance measurements from one of said plurality of calibration samples using an eddy current probe positioned at a distance relative to said one of said plurality of calibration samples;

(b) increasing the relative distance between said eddy current probe and said one of said plurality of calibration samples, and when an eddy current on air signal is detected, obtaining terminating resistance and reactance measurements;

(c) calculating a calibration sample intersecting line using said initial and terminating resistance and reactance measurements from said one of said plurality of calibration samples;

(d) determining a calibration intersecting point between said previously defined natural intercepting curve and said calibration sample intersecting line;

(e) defining a calibration point in a digital calibration graph based upon a reactance voltage of said calibration intersecting point and a corresponding thickness of said one of said plurality of known-thickness calibration samples; and (f) repeating operations (a) through (e) for each of said plurality of calibration samples to produce a plurality of calibration points that define said digital calibration curve.

7. A system for identifying metal layer thickness of an inspection sample, said system comprising:

a probe housing comprising eddy current sense and reference coils;

a linear motion controller providing relative motion between said probe housing and said inspection sample;

a processor for processing measurements obtained from said eddy current sense and reference coils, wherein said processor is configured to identify said metal layer thickness of said inspection sample by a method comprising:

obtaining initial resistance and reactance measurements from said inspection sample using said eddy current sense and reference coils positioned at a distance relative to said inspection sample;

increasing the relative distance between said eddy current sense and reference coils and said inspection sample, and when an eddy current on air signal is detected, obtaining terminating resistance and reactance measurements from said inspection sample;

calculating an inspection sample intersecting line using said initial and terminating resistance and reactance measurements;

determining an intersecting point between a previously defined natural intercepting curve and said inspection sample intersecting line, wherein said natural intercepting curve is defined by a plurality of initial resistance and reactance measurements obtained from a plurality of calibration samples having a range of known-thicknesses;

locating a reactance voltage of said intersecting point along a digital calibration curve to identify a closest two of said plurality of calibration samples, wherein said digital calibration curve is defined by a plurality of initial reactance measurements and corresponding thicknesses of said plurality of calibration samples; and identifying said metal layer thickness of said inspection sample by performing an interpolation between said closest two of said plurality of calibration samples.

8. The system according to claim 7, wherein each of said plurality of calibration samples comprise a metal layer of one type of material that is different than said metal layer of said inspection sample.

9. The system according to claim 7, wherein each of said plurality of calibration samples include a metal layer comprising annealed Ti 6-4, while said metal layer of said inspection sample comprises annealed copper.

10. The system according to claim 7, wherein said inspection sample comprises a semiconductor wafer comprising a metal top-layer; and wherein each of said plurality of calibration samples include a metal layer comprising annealed Ti 6-4, while said metal top-layer of said semiconductor wafer comprises annealed copper.

11. The system according to claim 7, wherein said inspection sample intersecting line eliminates offsetting error to compensate for thermal drift present in said eddy current sense and reference coils.

12. The system according to claim 7, wherein said digital calibration curve is generated using a method comprising:

(a) obtaining initial resistance and reactance measurements from one of said plurality of calibration samples using said eddy current sense and reference coils positioned at a distance relative to said one of said plurality of calibration samples;

(b) increasing the relative distance between said eddy current sense and reference coils and said one of said plurality of calibration samples, and when an eddy current on air signal is detected, obtaining terminating resistance and reactance measurements;

(c) calculating a calibration sample intersecting line using said initial and terminating resistance and reactance measurements from said one of said plurality of calibration samples;

(d) determining a calibration intersecting point between said previously defined natural intercepting curve and said calibration sample intersecting line;

(e) defining a calibration point in a digital calibration graph based upon a reactance voltage of said calibration intersecting point and a corresponding thickness of said one of said plurality of known-thickness calibration samples; and (f) repeating operations (a) through (e) for each of said plurality of calibration samples to produce a plurality of calibration points that define said digital calibration curve.

13. The system according to claim 7, said probe housing further comprising a capacitance sensor for determining proper relative distances between said eddy current sense coil and said inspection sample.

14. A method for generating an eddy current probe digital calibration curve, said method comprising:

(a) obtaining initial resistance and reactance measurements from a plurality of calibration samples having a range of known-thicknesses using an eddy current probe positioned at a distance relative to said plurality of calibration samples, wherein metal layers of each of said plurality of calibration samples and a metal layer of a later inspected inspection sample comprise different materials;

(b) defining a natural intercepting curve based on said plurality of initial resistance and reactance measurements;

increasing the relative distance between said eddy current probe and one of said plurality of calibration samples, and when an eddy current on air signal is detected, obtaining terminating resistance and reactance measurements;

(d) calculating a calibration sample intersecting line using said initial and terminating resistance and reactance measurements;

(e) determining a calibration intersecting point between said natural intercepting curve and said calibration sample intersecting line;

(f) defining a calibration point in a digital calibration graph based upon a reactance voltage of said calibration intersecting point and a corresponding thickness of said one of said plurality of calibration samples; and (g) repeating operations (c) through (f) for each of said plurality of calibration samples to produce a plurality of calibration points that define said digital calibration curve.

15. The method according to claim 14, wherein each of said plurality of calibration samples include a metal layer comprising annealed Ti 6-4.

* * * * *